United States Patent
Jonsson et al.

(10) Patent No.: US 7,561,637 B2
(45) Date of Patent: Jul. 14, 2009

(54) DETERMINATION OF A CHANNEL ESTIMATE OF A TRANSMISSION CHANNEL

(75) Inventors: Elias Jonsson, Malmö (SE); Johan Nilsson, Höllviken (SE); Bengt Lindoff, Bjärred (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 432 days.

(21) Appl. No.: 10/557,137

(22) PCT Filed: Apr. 9, 2004

(86) PCT No.: PCT/EP2004/004257

§ 371 (c)(1), (2), (4) Date: Jul. 9, 2006

(87) PCT Pub. No.: WO2004/102824

PCT Pub. Date: Nov. 25, 2004

(65) Prior Publication Data

US 2007/0072552 A1 Mar. 29, 2007

Related U.S. Application Data

(60) Provisional application No. 60/472,483, filed on May 21, 2003.

(30) Foreign Application Priority Data

May 19, 2003 (DK) ............................. 2003 00748
Oct. 13, 2003 (EP) ............................. 03388067

(51) Int. Cl.
*H03K 9/00* (2006.01)

(52) U.S. Cl. ............... 375/316; 370/203; 370/210; 370/260; 370/268; 370/328; 370/342; 455/101; 455/335; 455/337; 455/450

(58) Field of Classification Search ............ 455/67.11
See application file for complete search history.

(56) References Cited

U.S. PATENT DOCUMENTS 5,812,542 A * 9/1998 Bruckert et al. ............. 370/335

(Continued)

FOREIGN PATENT DOCUMENTS

EP 1 065 800 A1 1/2001

(Continued)

OTHER PUBLICATIONS

PCT International Search Report, dated Aug. 13, 2004, in connection with International Patent Application No. PCT/EP2004/004257.

(Continued)

*Primary Examiner*—Shuwang Liu
*Assistant Examiner*—Dhaval Patel
(74) *Attorney, Agent, or Firm*—Potomac Patent Group PLLC (57) ABSTRACT

A method of determining a channel estimate of a first transmission channel in a communications system. The method comprises deriving a first set of channel estimates from symbols received through said first transmission channel; deriving a second set of channel estimates from symbols received through a second transmission channel in the communications system; determining a scale factor between the first and second sets of channel estimates from a least squares error criterion; and determining the channel estimate of the first transmission channel as a channel estimate of the second transmission channel scaled by the determined scale factor.

21 Claims, 3 Drawing Sheets

U.S. PATENT DOCUMENTS

| | | | | |
|---|---|---|---|---|
| 5,852,630 | A | * | 12/1998 | Langberg et al. ............. 375/219 |
| 6,628,700 | B1 | * | 9/2003 | Miura ......................... 375/148 |
| 6,931,050 | B1 | * | 8/2005 | Bottomley .................. 375/130 |
| 2003/0072253 | A1 | * | 4/2003 | Hiramatsu .................. 370/206 |
| 2003/0108013 | A1 | * | 6/2003 | Hwang et al. ............... 370/335 |

FOREIGN PATENT DOCUMENTS

EP    1 191 755 A2    3/2002

OTHER PUBLICATIONS

PCT Written Opinion, dated Aug. 13, 2004, in connection with International Patent Application No. PCT/EP2004/004257.

PCT International Preliminary Report on Patentability, dated Nov. 25, 2005, in connection with International Patent Application No. PCT/EP2004/004257.

Usuda, M. et al., "Optimizing the Number of Dedicated Pilot Symbols for Forward Link in W-CDMA Systems," VTC 2000-Spring. 2000 IEEE 51$^{st}$ Vehicular Technology Conference Proceedings. Tokyo, Japan, May 15-18, 2000, IEEE Vehicular Technology Conference, New York, NY: IEEE, US, vol. 3 of 3, Conf. 51, May 15, 2000, XP000968378.

Kim, Hoon et al., "An Efficient Channel Estimation Scheme for Downlink in WCDMA/FDD Systems," IEEE, 2001, XP10562559A.

* cited by examiner

DETERMINATION OF A CHANNEL ESTIMATE OF A TRANSMISSION CHANNEL

CROSS REFERENCE TO RELATED APPLICATIONS

This application claims the benefit of U.S. Provisional Application No. 60/472,483 filed May 21, 2003, which is hereby incorporated herein by reference in its entirety. This application additionally claims foreign priority benefits under 35 U.S.C. §§119(a)-(d) or (f), or 365(b) of PA 2003 00748 filed in Denmark on May 19, 2003 and of 03388067.5 filed in Europe on Oct. 13, 2003, both of which are hereby incorporated herein by reference in their entireties.

FIELD OF THE INVENTION

This invention relates to the determination of a channel estimate of a transmission channel. The invention further relates to the determination of a signal-to-interference ratio based on a channel estimate.

BACKGROUND OF THE INVENTION

In a digital communications system, digital symbols representing information are transmitted between different nodes (e.g., base stations, mobile phones) to exchange information.

A layered model often referred to as the OSI (Open System Interconnection) model is often used to describe communication systems. The lowest layer in that model, where information streams consisting of bits are transmitted, is often referred to as the physical channel. A physical channel provides services with a pre-defined quality, depending on the arrangement. In a simplified description, a physical channel includes the formatting of bits in a predefined format, coding, interleaving, modulation of a carrier, transmission over a medium, down-conversion, demodulation, de-interleaving, and forward error correction. In addition, there are many other functions that are required for proper operation, such as synchronization in both time and frequency and channel estimation. Pilot symbols are often transmitted among information symbols on the physical channels. These pilot symbols are then used in the receiver to obtain synchronization and channel estimates. The channel estimates describe how the transmitted symbols are affected by the channel (including the modulation, TX front-end, medium, RX front-end, and demodulator) and are used to reconstruct the signal in the receiver.

Two types of physical channels are dedicated channels and common (e.g. broadcast) channels. Dedicated physical channels are transmitted to one receiver while common physical channels are intended for multiple receivers.

A base station most often transmits multiple physical channels. In TDMA systems, physical channels from the same base station are separated using time (and frequency if multiple carriers are used). In FDMA systems only frequency is used to separate different physical channels. In spread spectrum CDMA systems, codes are used to separate different users (and frequency if multiple carriers are used).

For several reasons, many of these physical channels contain pilot symbols that can be used to estimate channel properties. A pilot signal is typically one or more predetermined symbols that may be transmitted on its own channel or embedded in another channel and may be used for supervisory, control, equalization, continuity, synchronization, or reference purposes.

In a WCDMA system, pilot symbols of a common pilot channel (CPICH) and pilots transmitted in the dedicated physical channel (DPCH) are transmitted from the base station.

Regardless of the channel used, a received signal differs from the transmitted signal in various ways due to the effects of passing through the transmission medium. In a medium, such effects on a radio-frequency signal primarily include multipath fading, interference from other signals passing through the medium, and thermal noise. Fading is caused by the interaction of the signal with reflections or echoes of itself, and may result in large and highly localized amplitude and phase shifts of the signal. In a radio environment, interference is often caused by the unwanted presence of other radio signals. These other signals may be using the same channel as the desired signal (sometimes called co-channel interference) or using an adjacent channel (sometimes called adjacent channel interference). Thermal noise is present in all communication channels, and causes additional distortion of the transmitted signal. The signal received at the receiver can therefore be thought of as a composite signal consisting of a desired component and an impairment component. The impairment component represents the effects of passage through the medium, e.g., interference and noise.

In WCDMA the common pilot channel (CPICH) is commonly used as phase reference in the demodulation since that channel is often very strong, and accurate channel estimates are obtained. However, the pilots on the dedicated physical channel (DPCH) are needed for signal-to-interference ratio (SIR) estimation, to be used, for instance, in the power control loop, the RAKE finger selection procedure (especially in soft handover scenarios with different base stations), but also in signal strength measurements, such as "in-of-synch", "out-of-sync" measurements. Since the DPCH is power controlled and there are only relatively few pilot symbols on the DPCH, the obtained channel estimates and, therefore, also the obtained SIR estimates are noisy.

Prior art systems are mainly based on SIR estimation using dedicated pilots for channel estimation, and the pilot channel for interference estimation.

Such prior art systems typically suffer from noisy channel estimates causing a reduced system performance in terms of precision and accuracy of the channel estimates and, thus, the subsequent SIR estimation. A low precision and accuracy of the SIR estimate, in turn, significantly affect the power control performance of a communications system and, consequently, the capacity of the communications system.

SUMMARY OF THE INVENTION

The above and other problems are solved by a method of determining a channel estimate of a first transmission channel in a communications system, the method comprising
a) deriving a first set of channel estimates from symbols received through said first transmission channel;
b) deriving a second set of channel estimates from symbols received through a second transmission channel in the communications system;
c) determining a scale factor between the first and second sets of channel estimates from a least squares error criterion; and
d) determining the channel estimate of the first transmission channel as a channel estimate of the second transmission channel scaled by the determined scale factor.

Hence by using the estimates of two channels, and determining a scale factor relating the channel estimates of the two channels, the channel estimate for one of the channels is improved. Hence, the method utilises the fact that the difference between the channels can substantially be described by a scale factor, also called a gain offset. Consequently, by determining an estimate of the scale factor, an improved estimate of the channel estimate is provided.

By applying a Least Squares Error criterion to estimate the scale factor a high accuracy of the estimate is achieved. It is a further advantage of the method that it only requires a low computational complexity and may be implemented in cost and power efficient way, e.g. as a digital signal processing (DSP) implementation.

In particular, a low-complex method of determining a channel estimate may advantageously be used in the context of SIR estimation, since SIR estimation typically should be done very fast in order to fulfil power control timing requirements.

It is noted that the above method provides estimates that are independent of any interference estimates, even though, in some embodiments, interference estimates may be used to advantage.

Furthermore, it is noted that the above method based on a least squares approach may be implemented by means of linear operations, thereby considerably reducing the required complexity.

In one embodiment, the first and second transmission channels are radio transmission channels, but those skilled in the art will appreciate that the channels may be other transmission channels. Examples of transmission channels include telephone transmission channels, mobile telephone transmission channels, local area network transmission channels, etc. The channels may also be radio channels associated with phased array antenna elements or beams from a beam former.

In particular, it has been recognised by the inventors that the present invention may advantageously be applied to the channel estimation of the down-link DPCH in WCDMA. Accordingly, in a preferred embodiment, the first transmission channel is a dedicated physical channel (DPCH) in a WCDMA system and the second transmission channel is a common pilot channel (CPICH) in a WCDMA system.

In a preferred embodiment the step of determining the scale factor further comprises determining a minimum of an objective function, the objective function including an error term, said error term including a sum of squared error contributions each corresponding to one of a number of propagation delays, each of said error contributions corresponding to an error introduced by replacing the channel estimate of the first transmission channel by a channel estimate of the second transmission channel scaled by the scale factor. Hence, it is an advantage that a channel estimate is determined with high accuracy, since the scale factor is estimated on the basis of a plurality of individual channel estimates for individual propagation delays or fingers in a RAKE receiver. It is noted that the scale factor between the channels is substantially independent of the propagation delay.

In a further preferred embodiment, each of said error contributions is weighted by a respective weighting factor. Preferably, the weighting factors are selected responsive to an interference contribution of the corresponding propagation delay.

Furthermore, it is noted that in many communications systems, the information carried by a channel is organized in a plurality of time slots that are grouped in a succession of frames. Each slot may comprise a payload and additional information including pilot symbols, transmit power control (TPC) commands, etc. In one exemplary communications system, slots may have durations of 0.625 milliseconds and include variable numbers of bits, depending on the types of slots. The gain offset between two adjacent slots depends on the TPC command transmitted by the receiver during a previous slot. Hence, that knowledge can be incorporated to improve the gain offset estimation and, therefore, also the SIR estimation performance. Accordingly, in another preferred embodiment, the objective function further comprises a second term dependant on a gain offset determined for a previous time slot and on a TPC command transmitted during a previous time slot.

In a preferred embodiment, the scale factor comprises a power increment parameter, and wherein the method further comprises estimating the power increment parameter from a channel estimate of the first transmission channel and from an interference estimate.

Furthermore it is recognised that the performance gain achieved by the invention may depend on the current radio access bearer (RAB). For example, the performance gain is larger for RABs with low average DPCH power (implying a large spreading factor) and with few DPCH pilots. Hence, in a preferred embodiment, the above steps are performed conditioned on information received from a higher layer, e.g. the current RAB, thereby adapting the estimation method to the current RAB in order to reduce the complexity and, therefore, the power consumption.

Accordingly, in a preferred embodiment, the method further comprises
receiving information from a higher layer of a layered communications system; and
activating at least step d) conditioned on the received information.

According to another preferred embodiment, the method further comprises adapting at least one parameter of the objective function responsive to information about the current RAB. According to a further preferred embodiment, each of said error contributions of the error term of the objective function is weighted by a respective weighting factor, and wherein said weighting factors are determined responsive to information received from a higher layer of a layer communications system, preferably information about the radio access bearer.

Further preferred embodiments are disclosed in the dependant claims.

According to another aspect, it is an object of the invention to solve the problem of providing an improved SIR estimator for a transmission channel of a communications system.

This problem is solved by a method of determining a signal-to-interference ratio (SIR) for a first transmission channel in a communications system, the method comprising
determining a channel estimate of the first transmission channel by performing the steps of the first-mentioned method;
determining an interference estimate; and
deriving a signal-to-interference ratio from the determined channel estimate and the determined interference estimate.

It is noted that the features of the methods described above and in the following may be implemented in software and carried out on a data processing system or other processing means caused by the execution of program code means such as computer-executable instructions. Here and in the following, the term processing means comprises any circuit and/or device suitably adapted to perform the above functions. In particular, the above term comprises general- or special-purpose programmable microprocessors, Digital Signal Processors (DSP), Application Specific Integrated Circuits (ASIC), Programmable Logic Arrays (PLA), Field Programmable Gate Arrays (FPGA), special purpose electronic circuits, etc., or a combination thereof.

For example, the program code means may be loaded in a memory, such as a RAM, from a storage medium or from another computer via a computer network. Alternatively, the described features may be implemented by hardwired circuitry instead of software or in combination with software.

The present invention can be implemented in different ways including the method described above and in the following, a communications device, and further product means, each yielding one or more of the benefits and advantages described in connection with the first-mentioned method, and each having one or more preferred embodiments corresponding to the preferred embodiments described in connection with the first-mentioned method and disclosed in the dependant claims.

The invention further relates to a communications device for receiving communications signals via a transmission channel, the communications device comprising
- means for deriving a first set of channel estimates from symbols received through a first transmission channel;
- means for deriving a second set of channel estimates from symbols received through a second transmission channel in the communications system;
- means for determining a scale factor between the first and second sets of channel estimates from a least squares error criterion; and
- means for determining the channel estimate of the first transmission channel as a channel estimate of the second transmission channel scaled by the determined scale factor.

The term communications device comprises any device comprising suitable circuitry for receiving and/or transmitting communications signals, e.g. radio communications signals, to facilitate data communication. Examples of such devices include portable radio communications equipment and other handheld or portable devices. The term portable radio communications equipment includes all equipment such as mobile telephones, pagers, communicators, i.e. electronic organisers, smart phones, personal digital assistants (PDAs), handheld computers, or the like.

Further examples of communications devices include stationary communications equipment, for example stationary computers or other electronic equipment including a wireless communications interface. In one embodiment, one of the devices may be a network device, e.g. a base station of a cellular telecommunications network.

BRIEF DESCRIPTION OF THE DRAWINGS

The above and other aspects of the invention will be apparent and elucidated from the embodiments described in the following with reference to the drawing in which.

In the drawings, like reference signs are used for like and corresponding components, steps, etc.

DETAILED DESCRIPTION OF THE PREFERRED EMBODIMENTS

Figure 1:
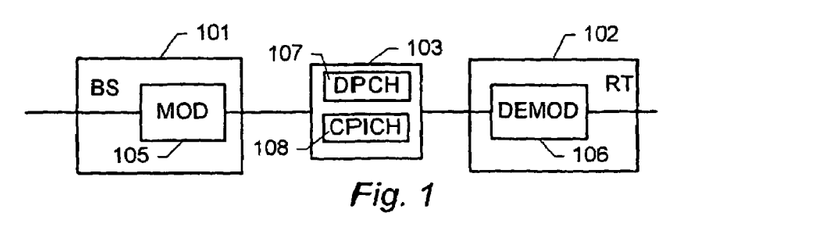
FIG. 1 schematically shows a block diagram of a digital communications system.

FIG. 1 schematically shows a block diagram of a digital communications system. The communications system comprises a transmitting communications device 101 and a receiving communications device 102 communicating via a communications channel 103. For example, in an actual implementation the transmitting communications device may be a base station of a cellular radio frequency (RF) communications system, and the receiving communications device a mobile terminal, or vice versa. The mobile terminal and the base station communicate with each other via communications signals transmitted over an air interface. It is understood that in most communications system some or all of the communications devices are both transmitting and receiving communications devices. For the purposes of the following description, the transmitting communications device 101 is considered to comprise a transmitter unit 105 which applies the necessary modulation to the signal so that it can be transmitted over the communications channel. The receiving communications device comprises a receiver 106 implementing a demodulation process corresponding to the modulation process implemented by the transmitter unit 105, thereby allowing recovering the originally transmitted information from the received signal.

In a 3GPP system, dedicated and common channels are transmitted using different signals, which are often referred to as physical channels. Hence, the transmission channel 103 comprises a number of physical channels 107 and 108. The physical channels are separated by channelization codes and/or time-multiplexing. Depending on the configuration of the base station, these signals may, however, be transmitted through the same medium, thereby experiencing the same multipath propagation.

The receiving communications device 102 may simultaneously receive the signals from the DPCH and CPICH channels 107 and 108, respectively, e.g. by different fingers of a RAKE receiver. The CPICH is broadcasted within each cell of a cellular telecommunications network using a specific channelization code and without power control. The power of the CPICH is chosen so that mobiles even outside the cell boundary can receive it. Thus, the power of the CPICH will in many cases be much higher than the power of DPCH's. Furthermore, the DPCH will in most cases be transmitted using power control, which is used to limit the power used by each individual DPCH to what is needed for each mobile to receive each DPCH. Thus, the transmission powers on each DPCH and the CPICH will in most cases differ by an amount unknown to the mobile. In the following, the ratio of the transmission powers will be referred to as the gain offset. It is noted that the gain offset may vary in time due to power control.

The DPCH and the CPICH may be transmitted using the same front-end and the same antenna at the base station, thereby causing these two channels to experience the same medium response. Thus, it is recognised that channel estimates based on the CPICH and DPCH are both useful for providing a good estimate of the channel coefficients.

During transmission of a communications signal, reflections due to buildings and other obstacles, result in fading and dispersion. Dispersion may cause multipath propagation depending on the symbol rate on the physical channel and the severity of the dispersion. Multipath propagation is generally disadvantageous, since the self-interference signals are time dispersed and therefore able to interfere with one another and create interference fading. Multipath propagation can, however, also be of benefit. The reflected signals transmit the same information as the main signal. When fading has caused pronounced attenuation of the main signal itself, the main signal can be "reconstructed" or amplified by constructive addition of the time-dispersed rays, i.e. the signal becomes diversity amplified.

At the receiving communications device 102, the receiver 106 processes the received signal to obtain a sequence or stream of digital samples and these samples may be represented as complex numbers. For example, the receiver may process the received signal including filtering, amplification, mixing down to baseband using in-phase and quadrature local oscillators, analog-to-digital (A/D) conversion, and synchronization, resulting in a stream of received samples.

The receiver 106 typically applies some form of baseband signal processing to the received sample stream to recover (or "detect") the information symbols represented by the received sample stream according to the modulation applied by the transmitter unit 105 of the transmitting communications device 101. Such baseband signal processing may be based on a model of the transmission medium. For example, the transmission medium may be modeled as a filter having a number of channel tap coefficients; the input to the filter is the transmitted digital signal and the output from the filter is the desired signal component of the received signal. If b(n) represents the transmitted digital signal, then the desired signal component samples s(n) are given by:

$$s(n)=h(0)b(n)+h(1)b(n-1)\ldots+h(K-1)b(n-K+1)$$

where h(k) are the channel tap coefficients that are complex values having both real parts and imaginary parts.

Estimates of the channel tap coefficients can be determined by various channel tap estimation techniques. Channel tap estimation, or channel tracking, is well known in the art and is discussed, for example, in "Digital Communications" 4th Edition, by John G. Proakis, McGraw-Hill, 2000. Initial channel tap estimates can be obtained from synchronization-signal correlation values or least-squares estimation using known techniques.

Figure 2:
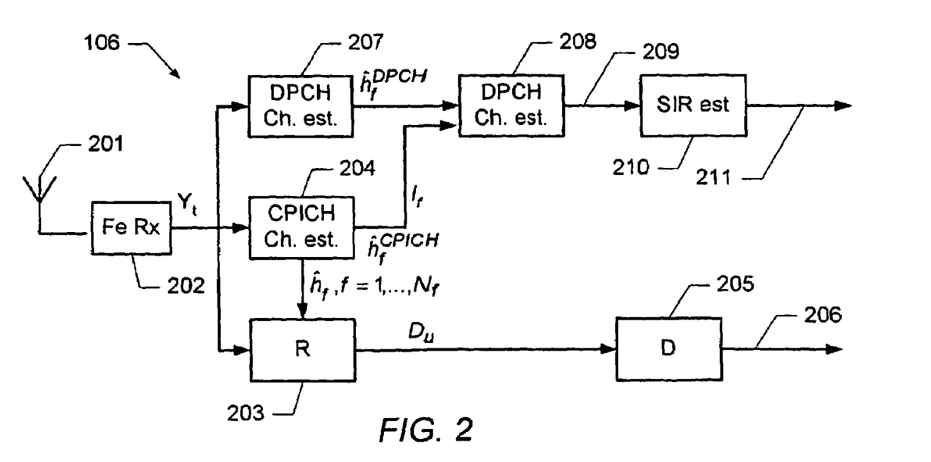
FIG. 2 schematically shows a block diagram of a first embodiment of a receiver including an arrangement for estimating a SIR.

FIG. 2 schematically shows a block diagram of a first embodiment of a receiver including an arrangement for estimating a SIR. The receiver, generally designated 106, comprises a front-end receiver 202 that down-converts and samples the received radio signal to a digital baseband signal $Y_t$. The receiver 106 further comprises a dedicated channel estimation unit 207, a common pilot estimation unit 204, and a RAKE receiver 203, each of which receive the digital baseband signal $Y_t$. The RAKE receiver uses several baseband correlators in the so-called fingers of the RAKE receiver in order to individually process several signal multipath components according to a corresponding propagation delay and channel estimate. The correlator outputs are combined to achieve improved communications reliability and performance (see e.g. "Digital Communications" 4th Edition, by John G. Proakis, McGraw-Hill, 2000). The RAKE receiver generates signal symbols $D_u$ which are fed to a decoder 205.

The channel estimation units 204 and 207 each receive the digital baseband representation $Y_t$ of the received radio signal and provide estimates of the transmission channel 103, based on the pilots transmitted over the respective channels 107 and 108. In particular, the channel estimation units each identify a number of radio paths with corresponding channel estimates $\hat{h}_f^{CH}, f \in F_b$ for the physical channel CH, where $F_b$ is the set of finger delays of the RAKE receiver for a given cell b, and the set of finger delays is indexed by f. In a typical example, there are 3-4 fingers for each cell. However, the method may also be applied to situations with a different number of fingers.

According to a model of the transmission channel, the channel estimate may be expressed as $$\hat{h}_f^{CH}=h_f+e_f,$$

where $h_f$ represents the actual channel and $e_f$ represents noise. The noise may be modeled according to a given noise distribution having a variance $I_f$. For example, the noise may be modeled as uncorrelated, zero-mean, complex Gaussian-distributed noise. The channel estimation unit 204 further provides an estimate of the interference power $I_f$ for each finger f. It is understood, however, that the interference power may alternatively be determined based on the DPCH.

Typically, the channel estimates are computed on a slot basis, i.e. a channel estimate $\hat{h}_{j,f}^{CH}$ represents an average of the actual channel over a time slot j. In the following, the channel estimates determined by the channel estimation unit 204 for the CPICH are denoted $\hat{h}_{j,f}^{CPICH}$, and the channel estimates determined by the channel estimation unit 207 for the DPCH are denoted $\hat{h}_{j,f}^{DPCH}$.

The estimation units may implement any suitable channel estimation technique known as such in the art, e.g. as described in "Digital Communications" 4th Edition, by John G. Proakis, McGraw-Hill, 2000. The channel estimates $\hat{h}_{j,f}^{CPICH}$ determined by channel estimation unit 204 for the CPICH for all RAKE fingers are fed to the RAKE receiver 203 and are subsequently used in the demodulation process by the decoder 205.

The CPICH and DPCH channel estimates $\hat{h}_{j,f}^{CPICH}$ and $\hat{h}_{j,f}^{DPCH}$, and the interference estimates $I_f$ are also fed to an additional channel estimation unit 208 that calculates an improved DPCH channel estimate 209. The improved DPCH channel estimate is then fed into a SIR estimation unit 210 that estimates the SIR as the square of the absolute value of the improved DPCH channel estimate, divided by the interference, thereby providing an improved DPCH signal-to-interference ratio 211.

Figure 3:
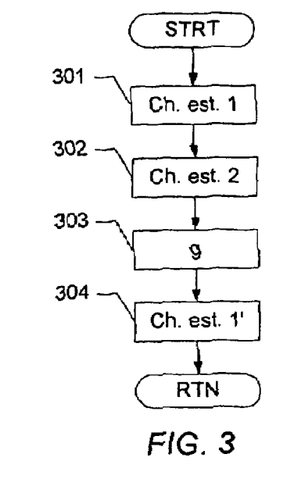
FIG. 3 shows a flow diagram of an embodiment of a method of estimating a channel estimate.

FIG. 3 shows a flow diagram of an embodiment of a method of estimating a channel estimate. In step 301, the CPICH channel estimates $\hat{h}_{j,f}^{CPICH}$ for time slot j are determined as described above. In step 302, the DPCH channel estimates $\hat{h}_{j,f}^{DPCH}$ for time slot j are determined as described above. In subsequent step 303, the gain offset or scale factor between the DPCH and the CPICH channels is determined. In the following, the gain offset between the DPCH and the CPICH in slot j will be denoted by $g_j^{(b)}$ for cell b, that is, $$E(\hat{h}_{j,f}^{DPCH})=g_j^{(b)}E(\hat{h}_{j,f}^{CPICH}), f \in F_b$$

where E(.) denotes the expectation value of the respective channel estimates. For the purpose of the present description it is assumed that the channel estimates are unbiased with respect to the propagation channel estimates. To estimate $g_j^{(b)}$ for each cell, the process determines a least squares error estimate. In particular, the process determines a minimum of the following objective function $$\min_{g_j^{(b)}} \sum_{f \in F_b} \alpha_f |\hat{h}_{j,f}^{DPCH} - g_j^{(b)} \hat{h}_{j,f}^{CPICH}|^2,$$

i.e. a weighted sum over all RAKE fingers of a squared error introduced for each finger by modelling the DPCH channel estimate as a scaled CPICH channel estimate. Here, $\alpha_f$ are weighting factors allowing a different weight to be assigned to different fingers. It is noted that the gain offset does not depend on the propagation delay of the different RAKE fingers. However, since the above objective function utilises channel estimates for all fingers, an improved estimate of the gain offset is achieved.

In one embodiment, the weighting factors are chosen inversely proportional to the interference for finger f, i.e. $\alpha_f = 1/I_f$, thereby weighting a finger, for which the interference is estimated to be small, relatively stronger than fingers with strong estimated interference. However, other choices of weighting factors are possible as well. For example, in one embodiment, all fingers may be weighted equally strong, i.e. $\alpha_f = 1 \forall f$, thereby providing a particularly simple implementation.

The minimum of the above expression, i.e. the determined gain offset is given by $$g_j^{(b)} = \frac{\sum_{f \in F_b} \alpha_f (\hat{h}_{j,f}^{CPICH} (\hat{h}_{j,f}^{DPCH})^* + (\hat{h}_{j,f}^{CPICH})^* \hat{h}_{j,f}^{DPCH})}{2 \sum_{f \in F_b} \alpha_f |\hat{h}_{j,f}^{CPICH}|^2}$$

Here, ( )* denotes complex conjugation. Hence, since the minimum of the above objective function may be determined in the above closed form, any numeric minimisation procedures are avoided. Furthermore, the determination of the gain offset according to the above equation only requires adding, complex multiplication, division, and complex conjugation operations, thereby allowing an efficient implementation in e.g. a DSP.

It is understood that, alternative to the above objective function, other objective functions may be used. For example, in one embodiment, the process minimizes $$\min_{g_j^{(b)}} \sum_{f \in F_b} \alpha_f ||\hat{h}_{j,f}^{DPCH}| - g_j^{(b)} |\hat{h}_{j,f}^{CPICH}||^2,$$

with the closed form solution $$g_j^{(b)} = \frac{\sum_{f \in F_b} \alpha_f |\hat{h}_{j,f}^{CPICH}| |\hat{h}_{j,f}^{DPCH}|}{\sum_{f \in F_b} \alpha_f |\hat{h}_{j,f}^{CPICH}|^2}.$$

Hence, in this embodiment, the objective function comprises a sum of squared errors of absolute values of the (complex) channel estimates. Hence, the determination of the gain offset according to this embodiment only involves operations involving real numbers, thereby further reducing the computational complexity. Further examples of objective functions will be described below.

In step 304, the process determines an improved DPCH channel estimate by taking $g_j^{(b)} \hat{h}_{j,f}^{CPICH}$, i.e. the CPICH channel estimate scaled by the estimated scaling factor, as the channel estimate for the DPCH. From this improved DPCH channel estimate, an improved DPCH SIR may be calculated by taking the square of the absolute value of the improved DPCH channel estimate and dividing by the interference $I_f$.

$$SIR_f = \frac{|g_j^{(b)} \hat{h}_{j,f}^{CPICH}|^2}{I_f}.$$

Figure 4:
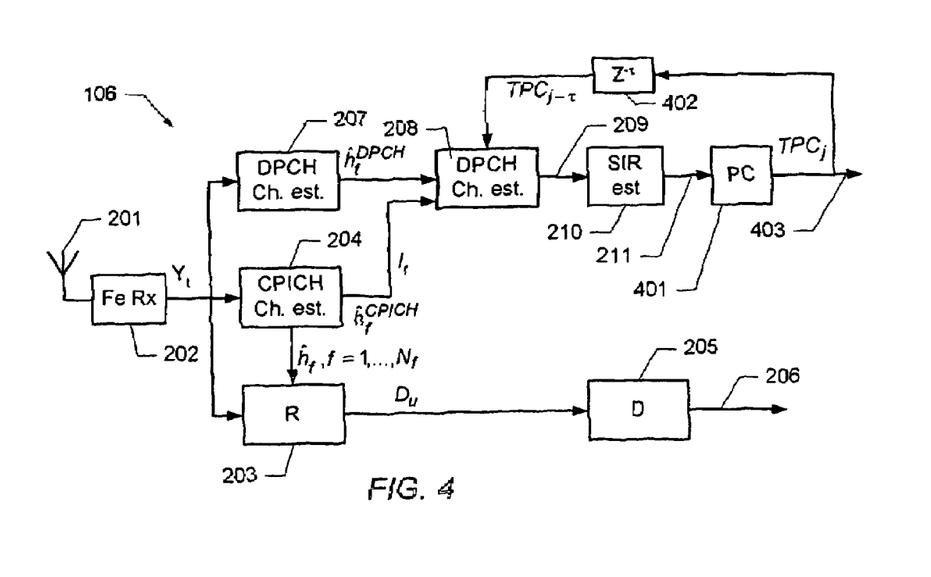
FIG. 4 schematically shows a block diagram of a second embodiment of a receiver including an arrangement for estimating a SIR.

FIG. 4 schematically shows a block diagram of a second embodiment of a receiver including an arrangement for estimating a SIR. According to this embodiment, the channel estimate is further based on power control commands of a power control loop. The receiver according to this embodiment is similar to the receiver described in connection with FIG. 2. The receiver further comprises a power control unit 401. The power control unit implements a closed loop power control of the power at which the receiver receives the communications signals on the DPCH. In particular, the transmitted power on the DPCH in slot j is changed by a factor $10^{\Delta_{TPC} TPC_{j-1}}$ relative to a previous slot j−1. Here, $\Delta_{TPC}$ is a fixed power increment set by the network, i.e. $\Delta_{TPC}$ determines by which amount the power is incremented. In some communications networks, the value of $\Delta_{TPC}$ is signaled to the receiver. However, in other systems this may not be the case. Furthermore, $TPC_{j-\tau}$ represents a power control command determined by the receiver for slot j−τ and transmitted to the base station. The power control command may assume two values: plus one ("+1") or minus one ("−1"), depending on whether the power should be increased or decreased in slot j. The power control unit 401 receives the SIR estimate 211 determined by the SIR unit 210 and determines a corresponding TPC command as the result of the closed loop power control on the DPCH. Closed loop power control as such is known in the art and may, for example, be performed as described in "WCDMA for UMTS Radio Access for Third Generation Mobile Communication" by H. Holma and A. Toskala, (Eds.), Wiley, 2000. The TPC command is returned to the transmitter, as indicated by arrow 403, and controls the adjustment of the transmit power at a later time slot. The TPC is further fed into the channel estimation unit 208. In order to account for the time needed for the TPC to be sent to the transmitter, the transmitter to react on the TPC, and the signals transmitted with the adjusted power to reach the receiver, the TPC is delayed by a delay circuit 402. The delay parameter τ specifies the delay before the TPC commands are considered in the base-station. It may be estimated using e.g. the method described in international patent application WO 02/054637 which is incorporated herein in its entirety by reference.

The channel estimation unit 208 performs a least squares error estimate taking the information about transmit power adjustments into consideration, as will now be described in greater detail with reference to FIG. 5.

Figure 5:
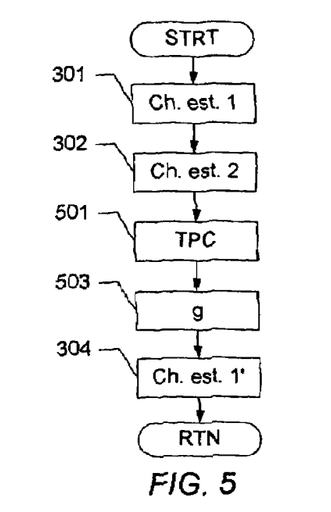
FIG. 5 shows a flow diagram of another embodiment of a method of estimating a channel estimate.

FIG. 5 shows a flow diagram of another embodiment of a method of estimating a channel estimate. In step 301, the CPICH channel estimates $\hat{h}_{j,f}^{CPICH}$ for time slot j are determined as described above. In step 302, the DPCH channel estimates $\hat{h}_{j,f}^{DPCH}$ for time slot j are determined as described above.

As mentioned above, the power increment factor $\Delta_{TPC}$ may be signaled to the receiver. If this is not the case, the process estimates it in step 501. In particular, the increment factor for slot j can be estimated from the DPCH channel estimate and the interference estimate, e.g. according to $$\hat{\Delta}_{j,TPC} = \sum_{f \in F_b} \frac{l_f}{\sum_{f \in F_b} l_f} \left| \log_{10} \left| \frac{\hat{h}_{j,f}^{DPCH}}{\hat{h}_{j-1,f}^{DPCH}} \right| \right|.$$

Preferably, the values determined according to the above equation are filtered in order to reduce noise. In a given system, the value of the increment factor does not change. Hence, the filtering can be made very strong. Let the filtered value in slot j be denoted by $\hat{\Delta}_{j,TPC}^{F}$. In a WCDMA system, $\Delta_{TPC}$ can only take on a number of discrete values, e.g. four different values, 0.5, 1, 1.5, and 2 dB. Hence, the final estimate for $\Delta_{TPC}$ is selected to be the value of these discrete values which is closest to $\hat{\Delta}_{j,TCP}^{F}$.

It is understood that, if the actual value of $\Delta_{TPC}$ is known to the receiver, the above step may be omitted.

In subsequent step 503, the gain offset $g_j^{(b)}$ between the DPCH and the CPICH channels is determined as a least squares error estimate as described above. However, in this embodiment, the objective function to be minimized is given by $$\min_{g_j^{(b)}} \sum_{f \in F_b} \alpha_f \left| \hat{h}_{j,f}^{DPCH} - g_j^{(b)} \hat{h}_{j,f}^{CPICH} \right|^2 + \alpha_g |g_j^{(b)} - g_{j-1}^{(b)} 10^{\Delta_{TPC} TPC_{j-\tau}}|^2.$$

Hence, in addition to the error term described in connection with FIG. 3, the objective function further comprises a second term that is dependent on the power control parameters. The second term reflects that a change in the gain offset from time slot j to time slot j−1 is expected in response to a TPC command $TPC_{j-\tau}$ at a previous time slot j−τ. The magnitude of the change is expected to be $10^{\Delta_{TPC} TPC_{j-\tau}}$. In the above objective function, $\alpha_g$ is a constant which is selected according to how strongly the prior TPC information is to be weighted. It is noted that an actual change in transmission power may not occur as would be expected by the receiver based on an issued TPC. For example, this may be due to possible errors in the TPC decoding. In some communications systems, such errors cause 3-4% of TPC commands to be decoded incorrectly, thereby decreasing the reliability of the prior TPC information for the purpose of determining the gain offset. For example, $\alpha_g$ may be selected to be smaller than 0.3, preferably smaller than 0.2, e.g. $\alpha_g=0.1$ or $\alpha_g=0.2$. It is noted that the embodiment of FIGS. 2 and 3 correspond to the choice $\alpha_g=0$.

The minimum of the above objective function is given by $$g_j^{(b)} = \frac{2\alpha_g g_{j-1}^{(b)} 10^{\Delta_{TPC} TPC_{j-\tau}} + \sum_{f \in F_b} \alpha_f \left( \hat{h}_{j,f}^{CPICH} (\hat{h}_{j,f}^{DPCH})^* + (\hat{h}_{j,f}^{CPICH})^* \hat{h}_{j,f}^{DPCH} \right)}{2\alpha_g + 2 \sum_{f \in F_b} \alpha_f |\hat{h}_{j,f}^{CPICH}|^2}.$$

As described above, in an alternative embodiment another objective function may be used, e.g. an objective function that is based on absolute values, thereby avoiding operations involving complex numbers. In one embodiment the objective function is $$\min_{g_j^{(b)}} \sum_{f \in F_b} \alpha_f \left| |\hat{h}_{j,f}^{DPCH}| - g_j^{(b)} |\hat{h}_{j,f}^{CPICH}| \right|^2 + \alpha_g |g_j^{(b)} - g_{j-1}^{(b)} 10^{\Delta_{TPC} TPC_{j-\tau}}|^2$$

with the closed form solution $$g_j^{(b)} = \frac{\alpha_g g_{j-1}^{(b)} 10^{\Delta_{TPC} TPC_{j-\tau}} + \sum_{f \in F_b} \alpha_f |\hat{h}_{j,f}^{CPICH}||\hat{h}_{j,f}^{DPCH}|}{\alpha_g + \sum_{f \in F_b} \alpha_f |\hat{h}_{j,f}^{CPICH}|^2}.$$

Finally, in step 304, the process computes an improved DPCH channel estimate by taking $g_j^{(b)} \hat{h}_{j,f}^{CPICH}$ as the channel estimate for the DPCH.

Figure 6:
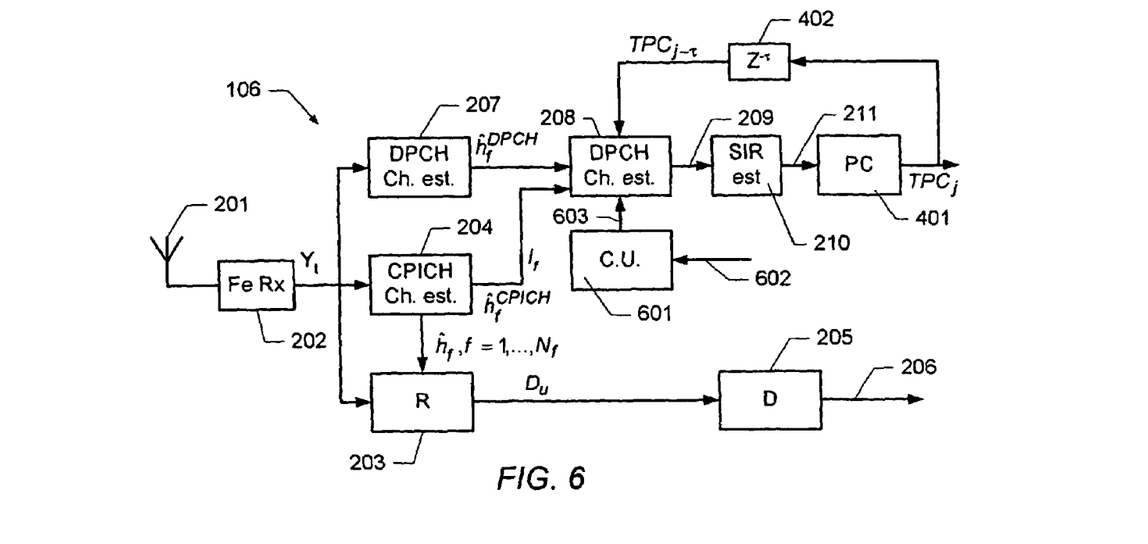
FIG. 6 schematically shows a block diagram of a third embodiment of a receiver including an arrangement for estimating a SIR.

FIG. 6 schematically shows a block diagram of a third embodiment of a receiver including an arrangement for estimating a SIR. The receiver according to this embodiment is similar to the receiver described in connection with FIG. 2. According to this embodiment, the receiver further comprises a control unit 601 that receives information 602 from a higher layer (not explicitly shown) of the communications model implemented by the receiver. In one embodiment, the control unit receives information about the current radio access bearer (RAB), e.g. information about the slot formats, information about the number of pilot symbols in the dedicated channel, information about spreading factors, etc. Based on this information the control unit generates a control signal 603 which is fed into the channel estimation block 208 to control the channel estimation and/or the subsequent SIR estimation process.

For instance, if a low rate data channel with high spreading factor and few DPCH pilot symbols are used, the SIR estimation method described in connection with one of the embodiments of FIGS. 3 and 5 may be used. If a high rate data channel with low spreading factor and a large number of DPCH pilot symbols is used, a simpler SIR estimation, e.g. based only on the DPCH pilots for signal power estimation, is used. For example, the control unit 601 may control a switch (not explicitly shown) causing one of a number of estimation units each implementing a different estimation method to be activated. For example, in one embodiment, the control unit may cause the improved channel estimation of block 208 to be bypassed if the channel estimate generated by channel estimator 207 is sufficient according to the received information 602.

Alternatively or additionally, the control unit 601 may determine one or more parameters of the channel estimator 208. In one embodiment, the control unit may control the weight factors $\alpha_t$ and/or $\alpha_g$ responsive to the radio access bearer. For example, for speech signals, the weight factors may be selected according to the estimated interferences as described above, while for higher rate signals, e.g. a video transmission, all weighting factors may be selected to be equal to one. Hence, according to this embodiment, the SIR estimation complexity and quality may be optimised according to the different needs of different communications scenarios.

It is noted that, in yet another embodiment, the control unit described in connection with FIG. 6 may be combined with the embodiment of FIG. 2 instead of FIG. 4.

It is further noted that the present invention may be used to improve the performance of the power control in a communications system. In particular, simulations have indicated that good SIR estimates can increase the power control performance in terms of a reduced average (and variance) of the needed DPCH power in the down-link. For instance, assuming ideal SIR estimates, a reduction of the average DPCH power by approximately 1.5-2 dB can be achieved for the WCDMA speech Radio Access Bearer (RAB) compared to the case where the SIR estimates are based on DPCH pilots. Even though the theoretical case of ideal SIR estimates cannot be achieved in a practical implementation, the above result indicates that a large performance gain in terms of system capacity can be achieved by improving the SIR estimation in the power control loop. For instance, 1 dB lower average down-link DPCH power means approximately 25% better capacity in the system. Furthermore, good SIR estimation also gives rise to better measurement performance which, in turn, also increases the down-link performance.

It is further noted that the improved channel estimates determined according to the invention may also be used for other purposes, e.g. to improve a soft value calculation in the subsequent signal processing.

It should be emphasized that the term "comprises/comprising" when used in this specification is taken to specify the presence of stated features, integers, steps or components but does not preclude the presence or addition of one or more other features, integers, steps, components or groups thereof.

Although preferred embodiments of the present invention have been described and shown, the invention is not restricted to them, but may also be embodied in other ways within the scope of the subject matter defined in the following claims.

The invention can be implemented by means of hardware comprising several distinct elements, and by means of a suitably programmed computer. In the device claims enumerating several means, several of these means can be embodied by one and the same item of hardware, e.g. a suitably programmed microprocessor or computer, one or more user interfaces, and/or one or more communications interfaces as described herein. The mere fact that certain measures are recited in mutually different dependent claims or described in different embodiments does not indicate that a combination of these measures cannot be used to advantage.

The invention claimed is:

1. A method in a device of determining a channel estimate of a first transmission channel in a communications system, the method comprising the device performing:
   a) deriving a first set of channel estimates from symbols received through said first transmission channel;
   b) deriving a second set of channel estimates from symbols received through a second transmission channel in the communications system;
   c) determining a scale factor between the first and second sets of channel estimates from a least squares error criterion; and
   d) determining the channel estimate of the first transmission channel as a channel estimate of the second transmission channel scaled by the determined scale factor, wherein determining the scale factor further comprises determining a minimum of an objective function, the objective function including an error term, said error term including a sum of error contributions each corresponding to one of a number of propagation delays, each of said error contributions corresponding to an error introduced by replacing the channel estimate of the first transmission channel by a channel estimate of the second transmission channel scaled by the scale factor.

2. A method according to claim 1, wherein the first transmission channel is a dedicated physical channel (DPCH) in a WCDMA system and the second transmission channel is a common pilot channel (CPICH) in a WCDMA system.

3. A method according to claim 1, wherein each of said error contributions is weighted by a respective weighting factor.

4. A method according to claim 3, wherein said weighting factors are selected responsive to an interference contribution of the corresponding propagation delay.

5. A method according to claim 3, wherein said weighting factors are determined responsive to information received from a higher layer of a layered communications system.

6. A method according to claim 1, wherein the objective function further comprises a second term dependant on a scale factor determined for a past time slot and on a TPC command transmitted during a previous time slot.

7. A method according to claim 6, wherein the scale factor comprises a power increment parameter, and wherein the method further comprises estimating the power increment parameter from the first set of channel estimates from symbols received through the first transmission channel and from an interference estimate.

8. A method according to claim 7, wherein the power increment parameter is estimated according to $$\hat{\Delta}_{j,TPC} = \sum_{f \in F_b} \frac{I_f}{\sum_{f \in F_b} I_f} \left| \log_{10} \left| \frac{\hat{h}_{j,f}^{DPCH}}{\hat{h}_{j-1,f}^{DPCH}} \right| \right|,$$

wherein the estimate of the power increment parameter for a slot j is denoted $\hat{\Delta}_{j,TPC}$, the interference estimate is denoted $I_f$, the channel estimates for a finger f of a RAKE receiver and for a slot j and j−1 are denoted $\hat{h}_{j,f}^{DPCH}$ and $\hat{h}_{j-1,f}^{DPCH}$, respectively; and wherein the sums include summations over the set of finger delays of a RAKE receiver.

9. A method according to claim 1, further comprising:
   receiving information from a higher layer of a layered communications system; and
   activating at least step d) conditioned on the received information.

10. A method of determining a signal-to-interference ratio (SIR) for a first transmission channel in a communications system, the method comprising:
   determining the channel estimate of the first transmission channel by performing the steps of the method according to claim 1;
   determining an interference estimate; and
   deriving a signal-to-interference ratio from the determined channel estimate of the first transmission channel and the determined interference estimate.

11. A communications device for receiving communications signals via a transmission channel, the communications device comprising:
   means for deriving a first set of channel estimates from symbols received through a first transmission channel;
   means for deriving a second set of channel estimates from symbols received through a second transmission channel in the communications system;
   means for determining a scale factor between the first and second sets of channel estimates from a least squares error criterion; and means for determining the channel estimate of the first transmission channel as a channel estimate of the second transmission channel scaled by the determined scale factor, wherein the means for determining the scale factor is adapted to determine a minimum of an objective function, the objective function including an error term, said error term including a sum of error contributions each corresponding to one of a number of propagation delays, each of said error contributions corresponding to an error introduced by replacing the channel estimate of the first transmission channel by a channel estimate of the second transmission channel scaled by the scale factor.

12. A communications device according to claim 11, further comprising:

means for determining an interference estimate; and means for deriving a signal-to-interference ratio from the determined channel estimate of the first transmission channel and the determined interference estimate.

13. A communications device according to claim 11, wherein the first transmission channel is a dedicated physical channel (DPCH) in a WCDMA system and the second transmission channel is a common pilot channel (CPICH) in a WCDMA system.

14. A communications device according to claim 11, wherein each of said error contributions is weighted by a respective weighting factor.

15. A communications device according to claim 14, wherein said weighting factors are selected responsive to an interference contribution of the corresponding propagation delay.

16. A communications device according to claim 14, wherein said weighting factors are determined responsive to information received from a higher layer of a layered communications system.

17. A communications device according to claim 11, wherein the objective function further comprises a second term dependant on a scale factor determined for a past time slot and on a TPC command transmitted during a previous time slot.

18. A communications device according to claim 17, wherein the scale factor comprises a power increment parameter, and wherein the communications device further comprises means for estimating the power increment parameter from the first set of channel estimates from symbols received through the first transmission channel and from an interference estimate.

19. A communications device according to claim 18, wherein the power increment parameter is estimated according to $$\hat{\Delta}_{j,TPC} = \sum_{f \in F_b} \frac{I_f}{\sum_{f \in F_b} I_f} \left| \log_{10} \left| \frac{\hat{h}_{j,f}^{DPCH}}{\hat{h}_{j-1,f}^{DPCH}} \right| \right|,$$

wherein the estimate of the power increment parameter for a slot j is denoted $\hat{\Delta}_{j,TPC}$, the interference estimate is denoted $I_f$, the channel estimates for a finger f of a RAKE receiver and for a slot j and j−1 are denoted $\hat{h}_{j,f}^{DPCH}$ and $\hat{h}_{j-1,f}^{DPCH}$, respectively; and wherein the sums include summations over the set of finger delays of a RAKE receiver.

20. A communications system according to claim 11, further comprising control means adapted to:

receive information from a higher layer of a layered communications system; and conditioned on the received information to selectively activate at least the means for determining the channel estimate of the first transmission channel as the channel estimate of the second transmission channel.

21. A computer program product comprising program code means adapted to cause a processor to perform a method of determining a channel estimate of a first transmission channel in a communications system, the method comprising:

a) deriving a first set of channel estimates from symbols received through said first transmission channel;

b) deriving a second set of channel estimates from symbols received through a second transmission channel in the communications system;

c) determining a scale factor between the first and second sets of channel estimates from a least squares error criterion; and d) determining the channel estimate of the first transmission channel as a channel estimate of the second transmission channel scaled by the determined scale factor, wherein determining the scale factor further comprises determining a minimum of an objective function, the objective function including an error term, said error term including a sum of error contributions each corresponding to one of a number of propagation delays, each of said error contributions corresponding to an error introduced by replacing the channel estimate of the first transmission channel by a channel estimate of the second transmission channel scaled by the scale factor.

* * * * *

UNITED STATES PATENT AND TRADEMARK OFFICE
CERTIFICATE OF CORRECTION

| | | |
|---|---|---|
| PATENT NO. | : 7,561,637 B2 | Page 1 of 1 |
| APPLICATION NO. | : 10/557137 | |
| DATED | : July 14, 2009 | |
| INVENTOR(S) | : Jonsson et al. | |

It is certified that error appears in the above-identified patent and that said Letters Patent is hereby corrected as shown below:

In Column 4, Line 62, delete "cornputer-executable" and insert -- computer-executable --, therefor.

In Column 10, Line 15, delete " $SIR_f = \dfrac{\left|g_j^{(b)} \hat{h}_{j,f}^{CPICH}\right|^2}{I_j}.$ " and insert -- $SIR_f = \dfrac{\left|g_j^{(b)} \hat{h}_{j,f}^{CPICH}\right|^2}{I_f}.$ --, therefor.

In Column 11, Line 10, delete " $\hat{\Delta}_{j,TPC} = \sum_{f \in F_b} \dfrac{I_f}{\sum_{f \in F_b} I_f} \log_{10} \left|\dfrac{\hat{h}_{j,f}^{DPCH}}{\hat{h}_{j-1,f}^{DPCH}}\right|$ " and insert -- $\hat{\Delta}_{j,TPC} = \sum_{f \in F_b} \dfrac{I_f}{\sum_{f \in F_b} I_f} \log_{10} \left|\dfrac{\hat{h}_{j,f}^{DPCH}}{\hat{h}_{j-1,f}^{DPCH}}\right|.$ --, therefor.

Signed and Sealed this

Twenty-sixth Day of January, 2010

David J. Kappos
*Director of the United States Patent and Trademark Office*